United States Patent
Hendon et al.

(10) Patent No.: US 9,032,064 B1
(45) Date of Patent: *May 12, 2015

(54) SYSTEM AND METHOD FOR MONITORING THE STATUS OF MULTIPLE SERVERS ON A NETWORK

(71) Applicant: Open Invention Network LLC, Durham, NC (US)

(72) Inventors: Samuel Hendon, Atlanta, GA (US); Colin Feeser, Atlanta, GA (US)

(73) Assignee: Open Invention Network, LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/190,433

(22) Filed: Feb. 26, 2014

Related U.S. Application Data

(63) Continuation of application No. 11/351,947, filed on Feb. 10, 2006, now Pat. No. 8,676,958.

(51) Int. Cl.
 *G06F 15/16* (2006.01)
 *H04L 12/26* (2006.01)

(52) U.S. Cl.
 CPC .................. *H04L 43/0823* (2013.01)

(58) Field of Classification Search
 USPC .................................................. 709/223, 224
 See application file for complete search history.

*Primary Examiner* — Adnan Mirza

(74) *Attorney, Agent, or Firm* — Haynes and Boone, LLP

(57) ABSTRACT

A system and method for monitoring a plurality of servers by a monitoring server in a computer network. A list of servers and a plurality of services to monitor in the computer network is generated at the monitoring server. A status query is transmitted sequentially by the monitoring server to each of the plurality of servers, the status query including the plurality of services to monitor at each server. A status message report is received from each of the plurality of servers in response to each status query. An event is reported in an event log for each server that has an abnormal service status. The transmission of the status query to each server is performed by the monitoring server at a specified service time interval.

29 Claims, 9 Drawing Sheets

FIG. 7A

Edit String

VALUE NAME:
ServiceTimeInterval

VALUE DATA:
600000

OKAY    CANCEL

FIG. 7B

Edit String

VALUE NAME:
SERVICES

VALUE DATA:
SERVER

OKAY    CANCEL

FIG. 7C

Edit String

VALUE NAME:
SERVICES

VALUE DATA:
SERVER TELNET

OKAY    CANCEL

SYSTEM AND METHOD FOR MONITORING THE STATUS OF MULTIPLE SERVERS ON A NETWORK

CROSS-REFERENCE TO RELATED APPLICATIONS

This application is a continuation from U.S. patent application Ser. No. 11/351,947, filed Feb. 10, 2006, and entitled SYSTEM AND METHOD FOR MONITORING THE STATUS OF MULTIPLE SERVERS ON A NETWORK, which is incorporated by reference herein in its entirety.

BACKGROUND OF THE INVENTION

The present invention relates generally to network monitoring systems. More specifically, the present invention relates to monitoring the performance of servers in a networked environment.

Various methods and tools have been used in the prior art to monitor the performance of network computer devices such as servers. Such monitoring tools include ping, port monitoring, and agents. None of these methods and tools have been totally reliable and they often provide false positives or miss actual failures. A brief description of the aforementioned tools and associated shortcomings is provided below.

The Ping utility is essentially a system administrator's tool that is used to see if a computer is operating and also to see if network connections are intact. Ping uses the Internet Control Message Protocol (ICMP) Echo function which is described in RFC 792. A small packet is sent through the network to a particular Internet Protocol (IP) address. This packet contains 64 bytes—56 data bytes and 8 bytes of protocol header information. The computer that sent the packet then waits (or 'listens') for a return packet. If the connections are good and the target computer is up, a good return packet will be received. One solution to monitoring server performance is to ping the servers to be monitored and provide an alert when a ping fails. This solution has proven to be ineffective because often the server could be hung while the network interface card was still responding to pings.

Another common technique is to provide an agent on each server to report back status to a monitoring device or server. This approach can cause false negatives which result in volumes of unnecessary support calls, or the reverse, i.e., no information of an actual failure.

Another common technique is to proactively monitor the server port (port monitoring) on a server to report back status to a monitoring device or server. A variation of this approach is to simply attempt to connect to the server. This can cause false negatives which result in volumes of unnecessary support calls or the reverse, i.e., no information of an actual failure.

A typical server system can provide numerous services to associated client devices. The operating status of an individual service can be determined by sending a query to the monitored server. The server sends a reply that includes the operating status of the service, indicating whether the service is running. The queries and replies usually include at least one query and reply per service status requested. In order to determine the status of multiple services at a single server, the monitoring server must send multiple queries and receive multiple replies.

Another approach is to generate a single query for all of the services provided by a monitored server. The monitoring server sends the query representing a request for the status of multiple services on the monitored server. The monitored server generates a compilation of information regarding the services that it offers, and transmits this information to the monitoring server. Although this approach reduces the number of queries directed to a monitored server, it also generates a significant amount of data on all services running on the monitored server.

Thus, there is a need for a monitoring system that does not rely on pings, agents, server connections, or port monitoring and thus does not have their associated vulnerabilities, but instead monitors the functionality of the actual device.

SUMMARY OF THE INVENTION

The present invention is directed to a system and method for monitoring the status of services on a plurality of servers in a computer network environment. In an exemplary embodiment, the "heartbeat monitor" service of the invention runs as a service on a Windows-based machine using a text file which contains a list of servers that the heartbeat monitor service is to check. It determines the services to check based upon the registry settings. If the status of a service on a monitored server is running, the heartbeat monitor service proceeds to check the next service and/or server. Any status other than running generates an alert which appears in a special Event Log folder located on the monitoring server.

In one aspect of the invention, a method is provided for monitoring a plurality of servers by a monitoring server in a computer network. A list of servers and a plurality of services to monitor in the computer network is generated at the monitoring server. A status query is transmitted sequentially by the monitoring server to each of the plurality of servers, the status query including the plurality of services to monitor at each server. A status message report is received from each of the plurality of servers in response to each status query. An event is reported in an event log for each server that has an abnormal service status. The transmission of the status query to each server is performed by the monitoring server at a specified service time interval.

In another aspect of the invention, a system is provided for monitoring a plurality of servers in a computer network. The system includes a component for generating a list of servers and a plurality of services to monitor in the computer network. A transmitting component sends a status query including the plurality of services to monitor to each of the plurality of servers sequentially. A receiving component receives a status message report from each of the plurality of servers. A reporting component records an event in an event log for each server that has at least one abnormal service status. The transmitting component transmits the status query via a text message at a specified service time interval.

In another aspect of the invention, a computer program product is provided for monitoring a plurality of servers in a computer network. The computer program product includes a non-transitory computer readable medium having computer readable code embedded therein. The computer readable medium includes program instructions that generate a list of servers and a plurality of services to monitor in the computer network. The computer readable medium further includes program instructions that transmit a status query including a plurality of services to monitor to each of the plurality of servers sequentially, program instructions that receive a status message report from each of the plurality of servers and program instructions that report an event in an event log for each server that has an abnormal service status. The program instructions that transmit the query to each server are executed at a specified service time interval.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIGS. 7A-7C illustrate user interface displays for editing the service time interval and services to be monitored on each server in an exemplary embodiment of the invention.

DETAILED DESCRIPTION OF THE INVENTION

Figure 1:
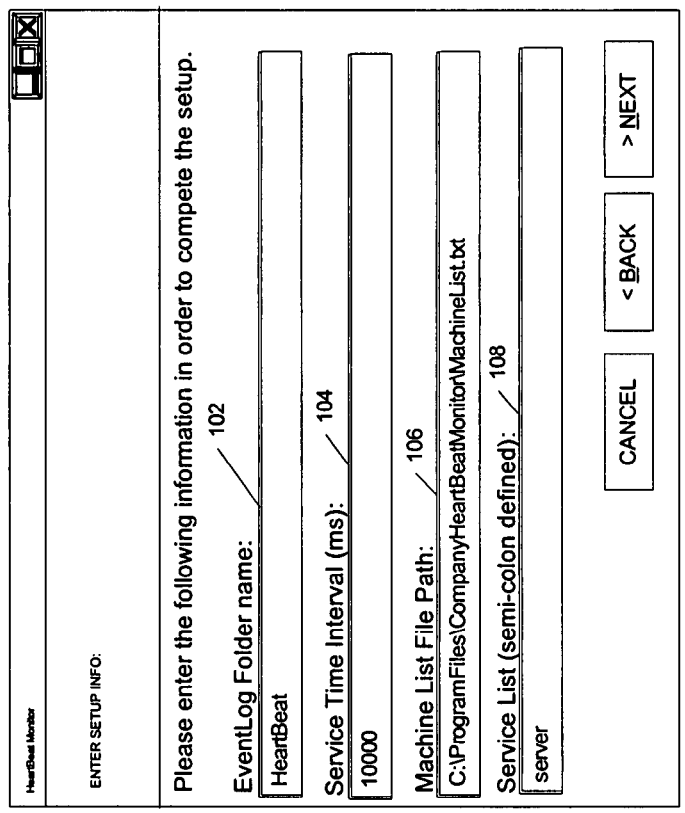
FIG. 1 illustrates a main parameters setting page in accordance with an exemplary embodiment of the invention.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

In an exemplary embodiment, the heartbeat monitor service of the invention is loaded on a specified .Net Framework based monitor server. Using a simple text-based list of servers to monitor and a parameter based list of Windows NT services, the heartbeat monitor service will check the status of each service per server. If a service is active and running, the monitor will move on to the next service. If the service is in any other state other than running, a report is made in a special event log. The heartbeat monitor service is a very simple concise method of checking the status of certain services on selected servers. More specifically, the heartbeat monitor service is designed to check the status of the server service on selected servers in order to determine if the server is viable on the network. If the heartbeat monitor service reports in the event log that the server service is not functioning for whatever reason, the chances are pretty certain that the server is not functioning on the network and requires attention.

The heartbeat monitor service works at a different level on the OSI (Open Systems Interconnection) Model than most other tools. This allows the heartbeat monitor service to provide a more reliable monitoring solution.

The monitor works at the Session Layer (layer 5) of the OSI model. By interrogating the layer 5 session, the monitor is able to determine that all lower network layers are functional and that layer 5 of the operating system is accepting client sessions and directing them to the proper resource on the operating system. This aspect is unique in that all other commercial products stop at the network layer (layer 3) and never test the actual operational state of the operating system.

The heartbeat monitor service is able to provide more accurate alarms by limiting the interrogation only to critical components of the device being monitored. By limiting the scope of interrogation and providing the service in a resource friendly package, the invention is able to ensure that the monitor does not provide false positive alarms.

The heartbeat monitor service can scale to a large server infrastructure. It can also be tuned as needed to meet the needs of the specific network being monitored.

The monitor is able to be scalable because it incorporates simple methods to make changes related to all aspects of the tool. For example, configurable settings include: (1) services to monitor; (2) remote hosts to poll; and (3) polling intervals.

Other available monitoring tools write the entire scope of the polling into scripts that are difficult to maintain and sometimes not changeable. A unique aspect of the heartbeat monitor service is the ability to manipulate the polling criteria via a user friendly graphical user interface, and the ability to change almost all parameters as needed.

The heartbeat monitor service includes quality reporting capability. The heartbeat monitor service offers versatility by way of reporting real time events, and also generating reports that determine the operational state of the remote agents.

For comparison, in the Microsoft Operations Manager (MOM) monitoring tool, all data reporting is driven by remote agents. This causes a constraint because the remote agent could fail, which would result in no reports being available. Because it functions in an agent driven environment, the manager could only respond if the agent object called.

The heartbeat monitor service utility addresses this deficiency by providing a parent driven environment that constantly polls the child host in a resource friendly method. This provides a higher availability of the child host.

The below table illustrates limitations from other products and methods, and reflects the capabilities of the heartbeat monitor service:

TABLE 1

| Technical Option | Disadvantage | Comparative Products | Heartbeat Monitor Service Capabilities |
| --- | --- | --- | --- |
| Host Agent | If the Host is not responsive, no Alarms can be generated. | Microsoft MOM | Does not rely on agents for monitoring. Reporting identifies the agents not running. |
| SNMP | Server functionality is not impacted by degraded service. | Shareware products; other licensed monitoring suites. | SNMP can fail without impacting server health and thus cause false positives. The invention uses a core service that other products do not provide. |
| PING | Only reports at OSI Layer | Scripting technologies; | Ping only monitors at OSI layer 2 which is network driven. On |

TABLE 1-continued

| Technical Option | Disadvantage | Comparative Products | Heartbeat Monitor Service Capabilities |
|---|---|---|---|
| | 2. | other licensed monitoring suites. | Windows-based machines, as long as power is given to the network interface card, it will respond. This is because the card has internal memory. The heartbeat monitor service uses layer 5, which is the session layer of the operating system. The session layer is responsible for accepting client requests and directing them to the proper resource. Thus, it is a more accurate indication of the status of actual server functionality. |
| Monitoring Suites Health check | Numerous false positives. No regard for network latency, momentary load averages. | Microsoft MOM, NETIQ | MOM and other type server monitors include a variety of tests that are susceptible to numerous false positives. They do not take into account network latency or temporary resource spikes. The heartbeat monitor service is driven at the session level, which incorporates a longer timeout and provides a session level connection. |

In an exemplary embodiment, the heartbeat monitor service is distributed in a Microsoft install file (.msi). Running this .msi file will properly install the service on the monitoring server. The user simply follows the prompts of the install process. In most cases, accepting the default entries is all that is required for a proper installation.

FIG. 1 illustrates the main parameters setting page. The first entry, EventLog folder name 102, is the name given to the special EventLog folder which will be created upon the start of the service. Service Time Interval (ms) 104, is the interval time in milliseconds in which the service will run its monitoring process. The default entry of 10000, which is equivalent to 10 seconds, should be changed to a more appropriate time. Machine List File Path 106, is the location of the text based list of servers which will be monitored. The default location points to the place where the heartbeat monitor service executable will be deployed. Finally, Service List (semicolon delimited) 108, is the list of services which will be monitored on each of the servers in the server list.

Figure 2:
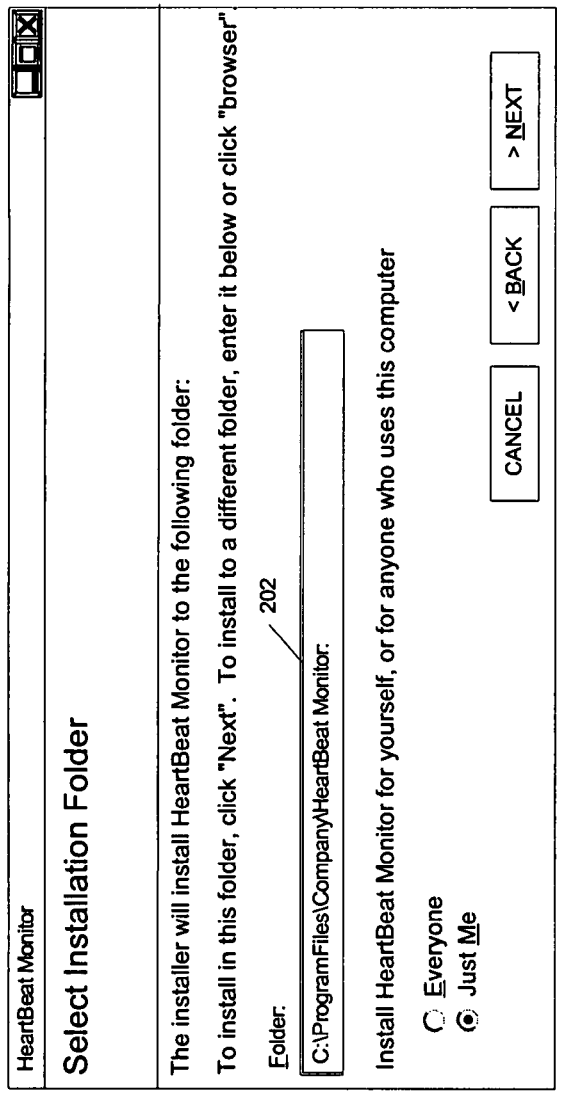
FIG. 2 illustrates a folder selection interface page to enable the user to select a location for installation of the heartbeat monitor service executable file in accordance with an exemplary embodiment of the invention.

As illustrated in FIG. 2, the final installation page contains the location 202 to which the service executable will be installed. The default location should be fine in most cases and will match the default location for the MachineList.txt file.

Once the install process has completed deploying the files, a prompt will appear for the user to input the credentials that the heartbeat monitor service will use to access the Service Control Manager of each monitored server. Note that in most cases this should be a Windows NT domain ID that has administrative access to the servers. The user inputs the Username using the format domain\userID. The user inputs the Password and then confirms the Password. Should the two password inputs not match, or the passwords do not match the ID, or the ID is not available on the network, the user will be prompted to try again. After three attempts, the installer will uninstall the service and prompt the user to run the installer again.

Once the installation is complete the user will receive a prompt. The user selects "Close" and the heartbeat monitor service will be completely installed and running on the monitoring server. The first monitor pass will begin after the Service Time Interval (ms) period has completed.

While the heartbeat monitor service is in a running state, it will launch a monitor process at every interval specified in the Service Time Interval (ms) parameter. If the parameter is set to 900000 milliseconds, which is equivalent to 15 minutes, the monitor process will launch every 15 minutes. When it launches the process will read the machinelist.txt file and step through each machine, opening the Service Control Manager and checking the status of each service listed in the Service List parameter. If the service status is returned as running, the process will move to the next service or the next server, depending on how many services are being checked. If the service status is in any other condition a report will be made in the EventLog.

Figure 3:
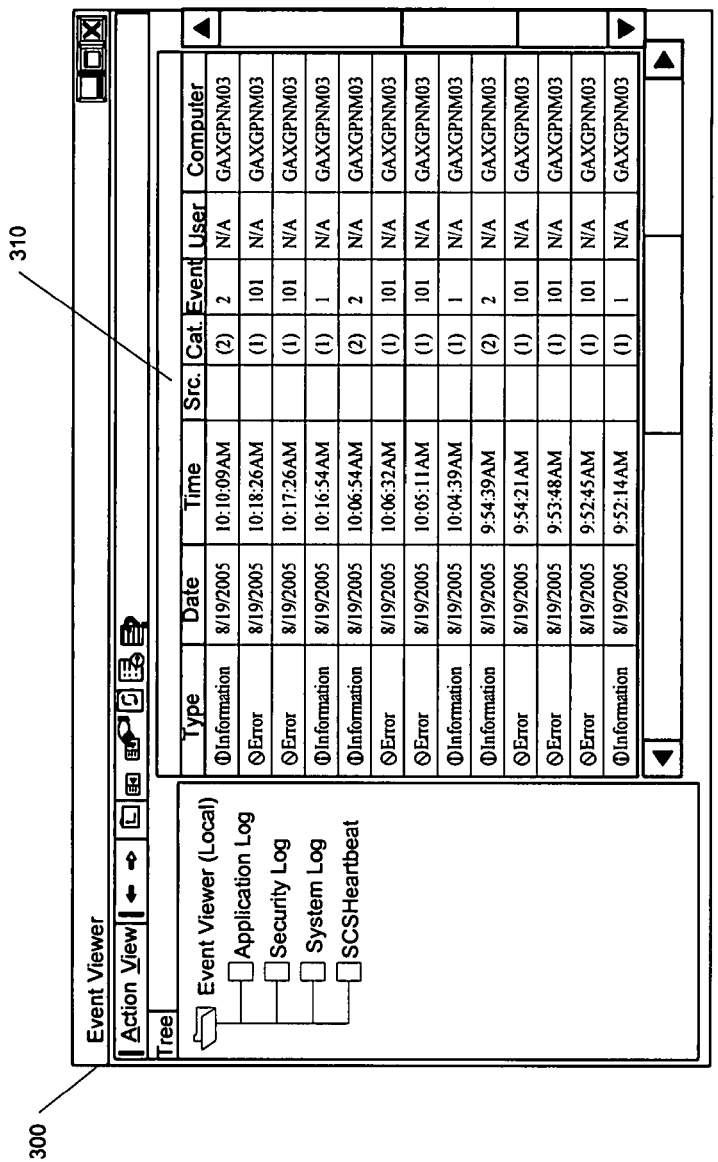
FIG. 3 illustrates a special event log for recording the operational status of a service on a monitored server in accordance with an exemplary embodiment of the invention.

FIG. 3 illustrates an exemplary special event log for recording the operational status of a service on a monitored server. When the heartbeat monitor service starts the first time, it creates a special folder in the Event Viewer 300. The name of the folder was established upon installation of the service in the parameters page, the default of which is Heartbeat Monitor Service.

There are only seven types of event entries that will be made in the EventLog 310 by heartbeat monitor service:

1. Event 91—(Information) heartbeat monitor service has started.
2. Event 92—(Information) heartbeat monitor service has stopped.
3. Event 1—(Information) the monitoring process begins.
4. Event 2—(Information) the monitoring process has completed.
5. Event 3—(Warning) service was unable to open the MachineList.txt file.
6. Event 101—(Error) an error occurred checking the status of the service.
7. Event 102—(Information) the service is in a state other than running.

In the scenario where the sole purpose of the heartbeat monitor service is to monitor the network availability of a set of servers, the event message that will be most pertinent will be Event 101.

Figure 4:
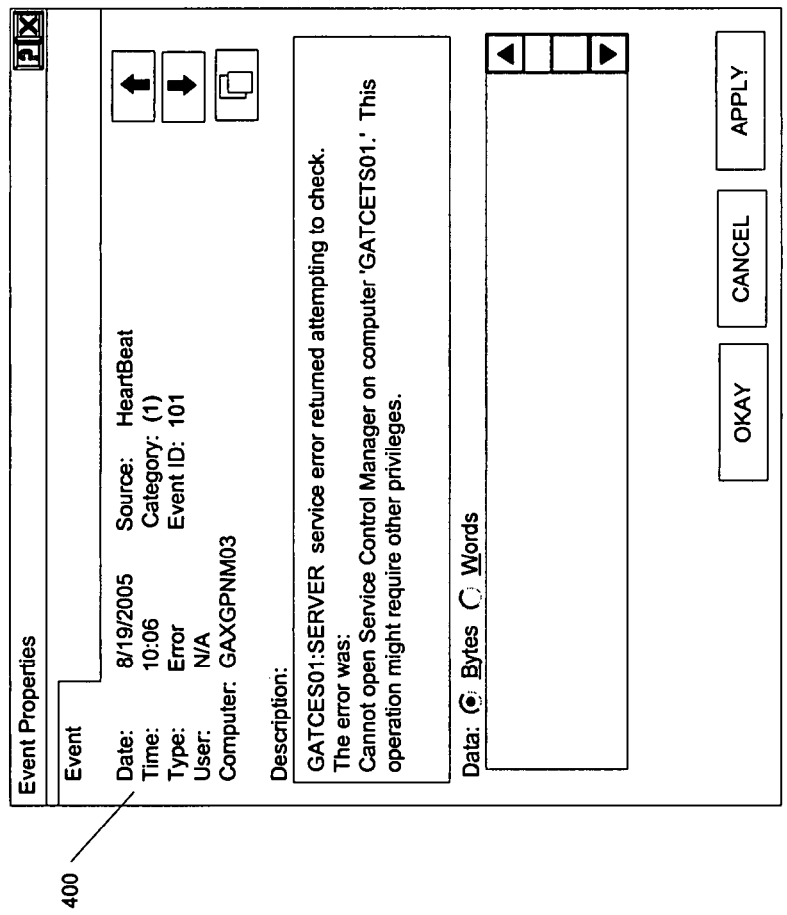
FIG. 4 illustrates an events property page for an event recorded in the event log in accordance with an exemplary embodiment of the invention.

When this message is written to the EventLog 310, it means that heartbeat monitor service attempted to check the status of the server service on GATCETS01 and was unable to even open the Service Control Manager. Assuming that appropriate credentials were supplied during installation, this error could only mean that the server is in a state which makes the Service Control Manager inaccessible from the network. In most cases, this will mean that a problem has occurred with the server service and that the server itself needs attention. Therefore, monitoring for this event message will be a priority in using this server monitoring tool. FIG. 4 illustrates an exemplary events property page for an event recorded in the event log.

Figure 5:
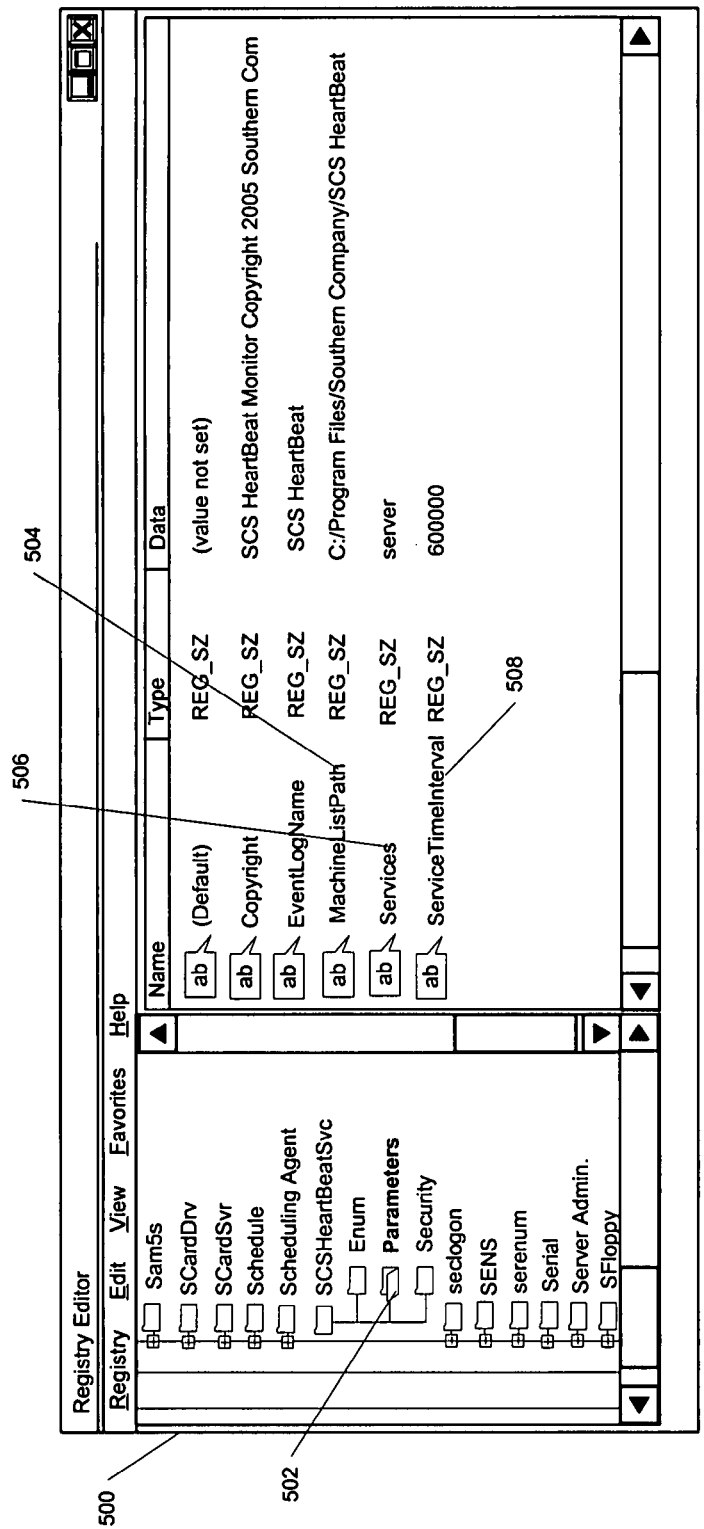
FIG. 5 illustrates a registry editor page in accordance with an exemplary embodiment of the invention.

The settings which were entered at the time of installation are saved in the registry and can be changed at anytime using the Registry Editor. FIG. 5 illustrates an exemplary Registry Editor page 500. After opening the Registry Editor, the user/administrator can migrate to HKEY_LOCAL_MACHINE\SYSTEM\CurrentControlSet\Services\SCSHeartbeatSvc to change the parameter settings.

Under the Parameters key 502 are the three main parameters which the user may want to change:

MachineListPath 504—The path which points to the location where the MachineList.txt file exists. This can also assign a specific name to the file, such as in this case it is called "gpcservers.txt".

Services 506—The list of services which are to monitored on each server. If there is more than one service to be monitored, each service should be separated by a semi-colon.

ServiceTimeInterval 508—The time interval, in milliseconds, which passes before the service starts the monitoring process. In the example above, the interval has been set to 10 minutes. Note that this interval begins when the previous process has completed or when the service starts.

Figure 6:
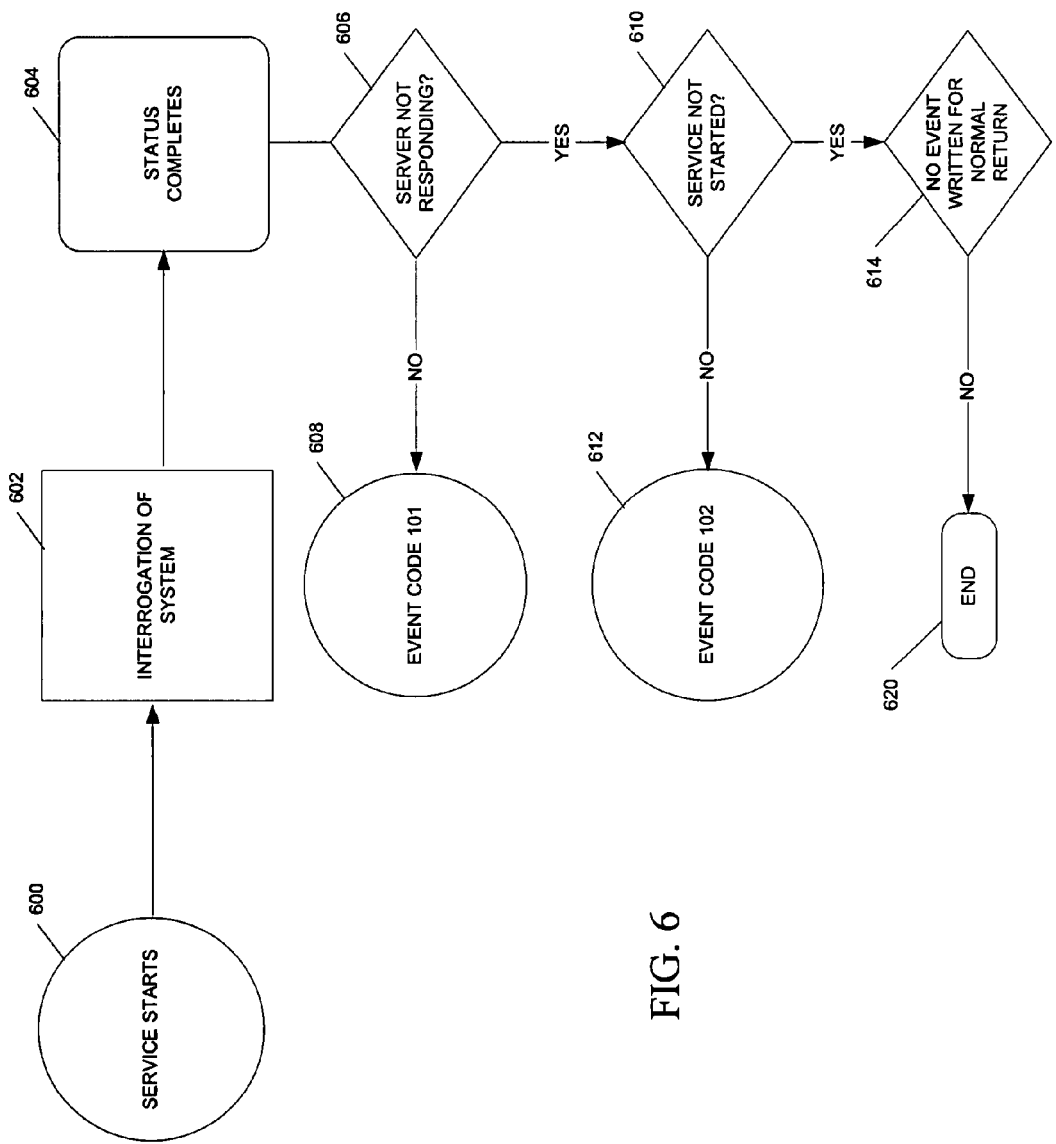
FIG. 6 illustrates processing logic for the heartbeat monitor service in accordance with an exemplary embodiment of the invention.

FIG. 6 illustrates the processing logic for the heartbeat monitor service in an exemplary embodiment. The logic depicted is performed for each server sequentially at the pre-specified service time interval. Processing starts in step 600 with activation of the heartbeat monitor service. Interrogation of a system server is initiated in step 602 with a list of services to be checked for operational status. The services status checking continues until all services have been checked as indicated in step 604. In decision step 606, a determination is made as to whether or not the server is responding to the status query. If the server is not responding, an error event is generated and logged indicating that the heartbeat monitor service attempted to check the status of a server service and was unable to open the Service Control Manager for the server. If the server is found to be responding in decision step 606, then a determination is made as to whether or not a service is started as indicated in decision step 610. If the service is not started, an event is generated and logged indicating that the service is in a state other than running as indicated in step 612. Otherwise, the service is started and in step 614, processing logic will not write an event to the event log for a normal return from the status checking Processing logic for checking the status of server services then continues as indicated in step 620.

FIGS. 7A-7C illustrate user interface displays for editing the service time interval and services to be monitored on each server using the registry editor. In the example of FIG. 7A, the user has edited the service time interval to a value of 600,000 milliseconds (i.e., 10 minutes). The service does not run continuously, but only at the specified and variable service time interval. In FIG. 7B, the user has edited the services to be monitored to a value of "server." In FIG. 7C, the user has edited the services to be monitored to include "server telnet."

Figure 8:
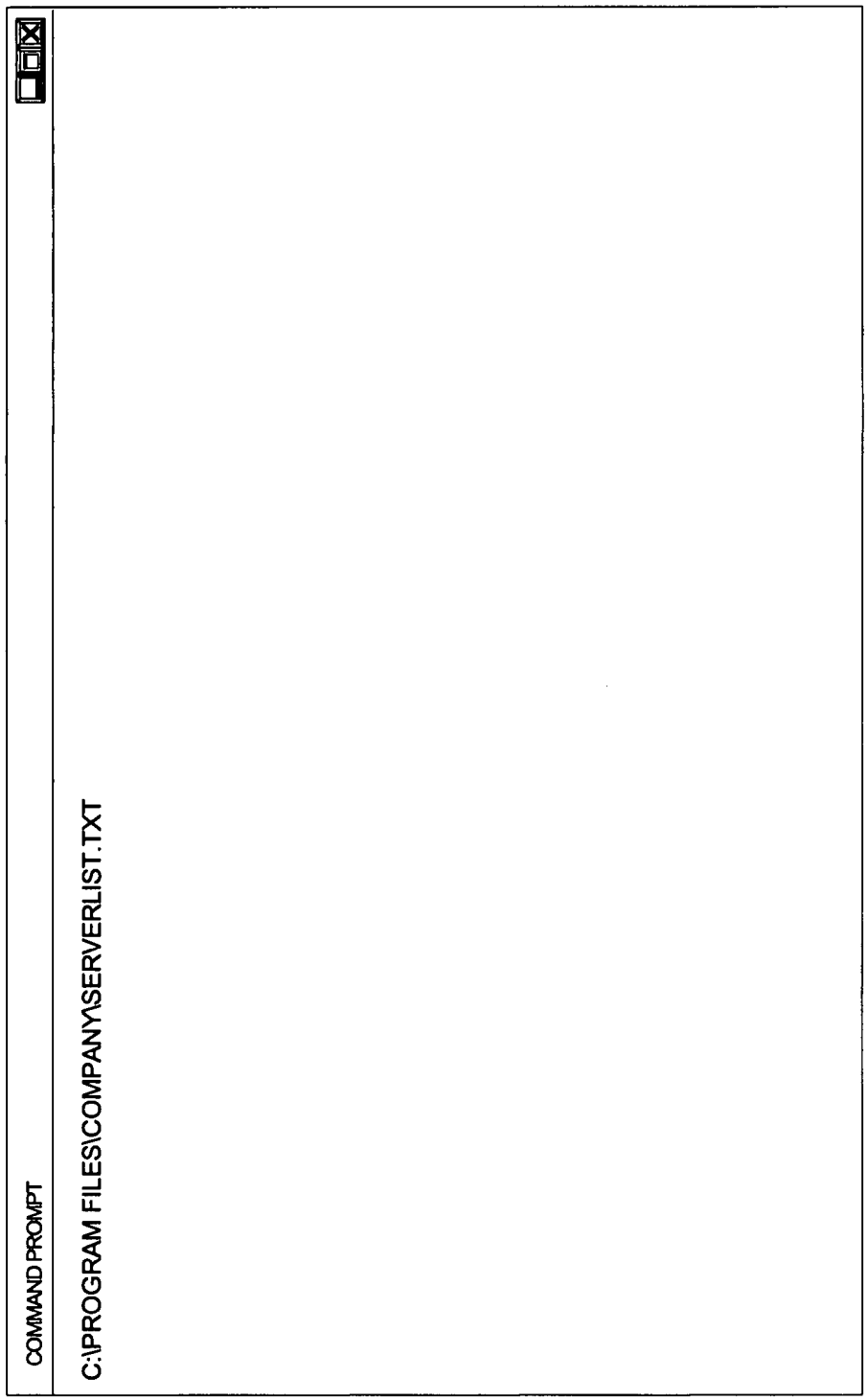
FIG. 8 illustrates an exemplary command line prompt to check the status of other services that are not run in an automatic mode.

FIG. 8 illustrates an exemplary command line prompt to check the status of other services that are not run in an automatic mode.

Figure 9:
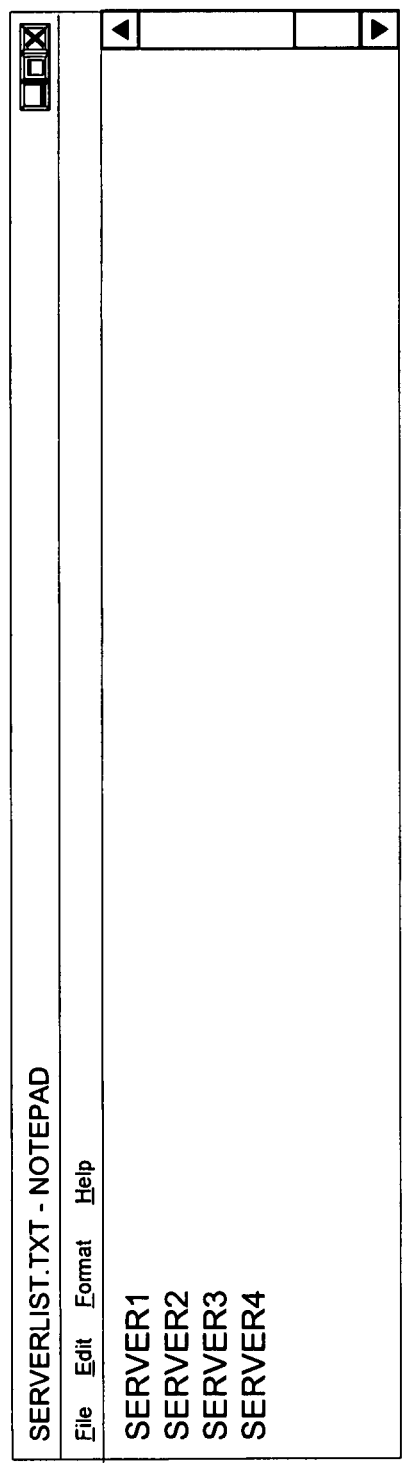
FIG. 9 illustrates an exemplary server list display for administration of the heartbeat monitor service.

FIG. 9 illustrates an exemplary server list display for administration of the heartbeat monitor service. The server list is a single flat text file.

The server monitoring system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. A method, comprising:
generating a list of servers to monitor in a computer network through a monitoring server wherein at least one text file is input containing the list of servers;
determining a plurality of services to monitor;
transmitting the plurality of services to monitor to each of the plurality of servers, wherein a heartbeat monitor service determines the services to monitor based on registry settings by monitoring the functionalities of the plurality of servers;
receiving a status message report from each of the plurality of servers; and
reporting an event in an event log for each of the plurality of servers that has an abnormal service status as determined through the output.

2. The method of claim 1 wherein the transmitting of the plurality of services to monitor is performed by the monitoring server at a specified service time interval.

3. The method of claim 1 wherein the status message report is received by the monitoring server only when an abnormal condition for a service is detected.

4. The method of claim 1 wherein the plurality of services are monitored at a session layer of an Open Systems Interconnection (OSI) Model.

5. The method of claim 2 further comprising reconfiguring the specified service time interval at which the monitoring server transmits the plurality of services to monitor.

6. The method of claim 1 further comprising reconfiguring the plurality of services to be monitored at each server.

7. The method of claim 1 wherein an event is reported in the event log if an error occurred while checking the status of a service.

8. The method of claim 1 wherein an event is reported in the event log if the status of a service is other than running.

9. The method of claim 1 wherein an event is reported in the event log at a start of the monitoring of the services for each server.

10. The method of claim 1 wherein an event is reported in the event log at an end of the monitoring of the services for each server.

11. A non-transitory computer program product comprising a computer readable medium having computer readable code embedded therein, the computer readable medium comprising:
program instructions that generate a list of servers in a computer network through a monitoring server, wherein at least one text file is input containing the list of servers;
program instructions that determine a plurality of services to monitor;
program instructions that transmit the plurality of services to monitor to each of the plurality of servers, wherein a heartbeat monitor service determines the services to monitor based on registry settings by monitoring the functionalities of the plurality of servers;
program instructions that receive a status message report from each of the plurality of servers; and program instructions that report an event in an event log for each of the plurality of servers that has an abnormal service status as determined through the output.

12. The non-transitory computer program product of claim 11 wherein the program instructions that transmit the plurality of services to monitor are executed at a specified service time interval.

13. The non-transitory computer program product of claim 11 wherein the program instructions that receive a status message report only receive the status message report when an abnormal condition for a service is detected.

14. The non-transitory computer program product of claim 11 wherein the plurality of services are monitored at the session layer of an Open Systems Interconnection (OSI) Model.

15. The non-transitory computer program product of claim 12 further comprising program instructions for reconfiguring the specified service time interval at which the monitoring server transmits the plurality of services to monitor.

16. The non-transitory computer program product of claim 11 further comprising program instructions for reconfiguring the plurality of services to be monitored at each server.

17. The non-transitory computer program product of claim 11 wherein the program instructions that report an event write an event in the event log if an error occurred while checking the status of a service.

18. The non-transitory computer program product of claim 11 wherein the program instructions that report an event write an event in the event log if the status of a service is other than running.

19. The non-transitory computer program product of claim 11 wherein the program instructions that report an event write an event in the event log at a start of the monitoring of the services for each server.

20. The non-transitory computer program product of claim 11 wherein the program instructions that report an event write an event in the event log at an end of the monitoring of the services for each server.

21. A system, comprising:
a component for generating a list of servers to monitor in a computer network through a monitoring server, wherein at least one text file is input containing the list of servers,
a component for determining a plurality of services to monitor;
a component for transmitting the plurality of services to monitor to each of the plurality of servers, wherein a heartbeat monitor service determines the services to monitor is determined based on registry settings by monitoring the functionalities of the plurality of servers;
a component for receiving a status message report from each of the plurality of servers; and
a component for reporting an event in an event log for each of the plurality of servers that has an abnormal service status as determined through the output.

22. The system of claim 21 wherein the component for transmitting the plurality of services to monitor occurs at a specified service time interval.

23. The system of claim 21 wherein the component for receiving a status message report only receives the status message report when an abnormal condition for a service is detected.

24. The system of claim 22 further comprising a component for reconfiguring the specified service time interval at which the plurality of services to monitor is transmitted.

25. The system of claim 22 further comprising a component for reconfiguring the plurality of services to be monitored at each server.

26. The system of claim 21 wherein the component for reporting an event writes an event in the event log if an error occurred while checking the status of a service.

27. The system of claim 21 wherein the component for reporting an event writes an event in the event log if the status of a service is other than running.

28. The system of claim 21 wherein the component for Reporting an event writes an event in the event log at a start of the monitoring of the services for each server.

29. The system of claim 21 wherein the component for reporting an event writes an event in the event log at an end of the monitoring of the services for each server.

* * * * *